Aug. 27, 1963  E. R. ANDERSON  3,101,866
ENDLESS MECHANISM FOR ARTICLE-BY-ARTICLE DISCHARGE
Filed Aug. 9, 1961  6 Sheets-Sheet 1
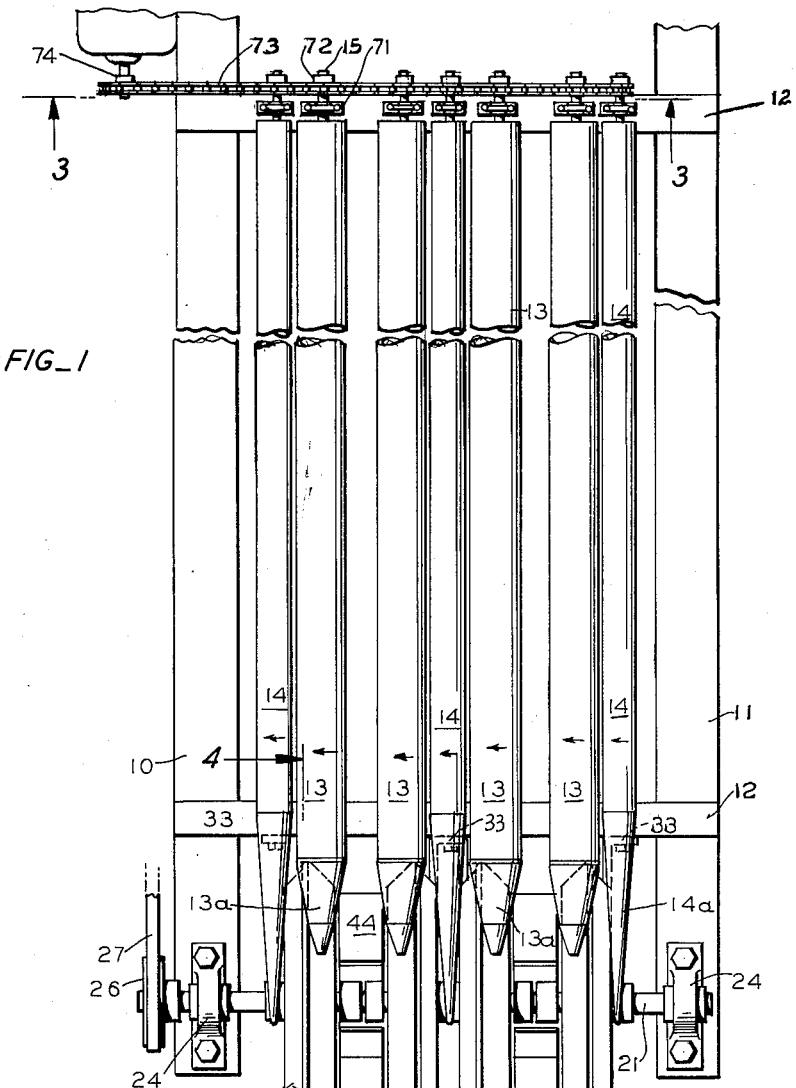
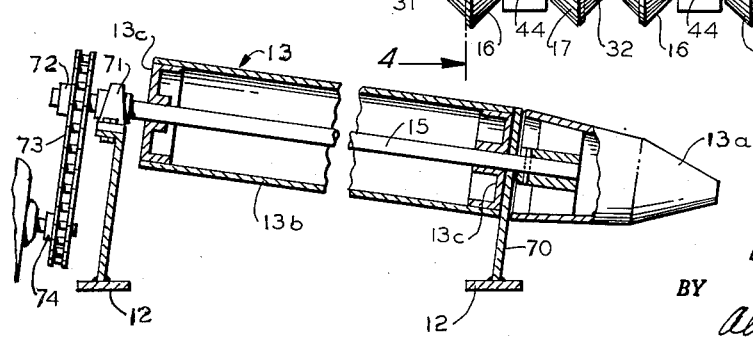
INVENTOR.
EARL R. ANDERSON
BY
*Allen and Chromy*
ATTORNEYS Aug. 27, 1963     E. R. ANDERSON     3,101,866
ENDLESS MECHANISM FOR ARTICLE-BY-ARTICLE DISCHARGE
Filed Aug. 9, 1961     6 Sheets-Sheet 2
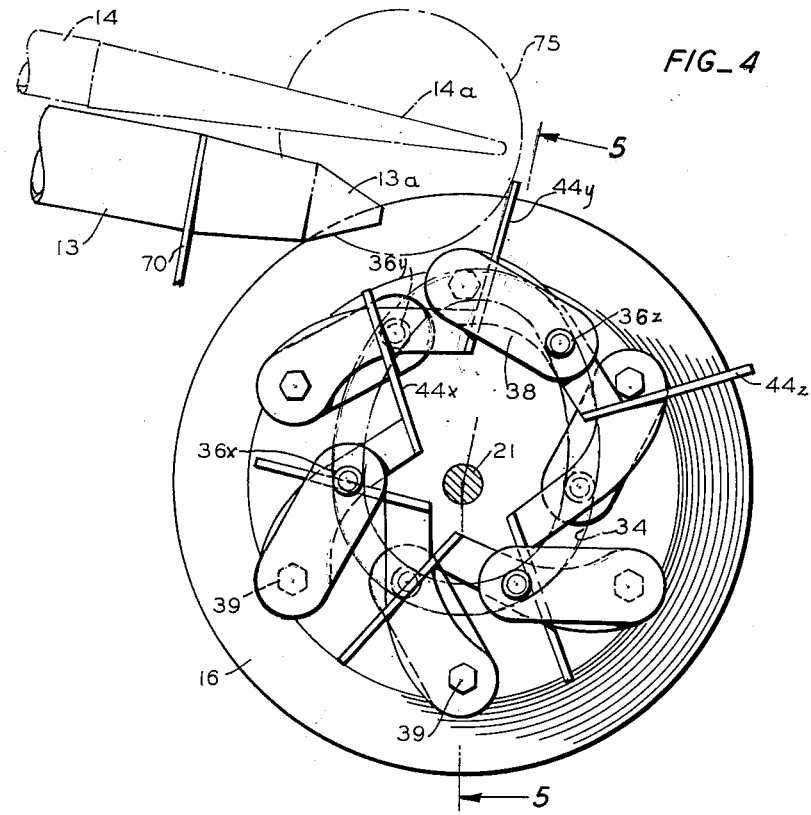
FIG_4
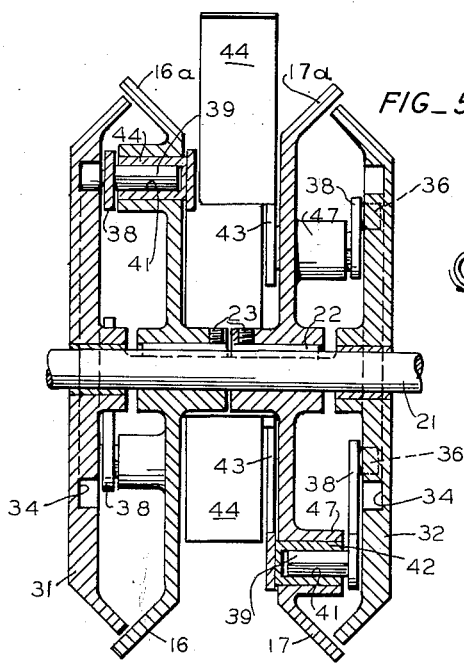
FIG_5
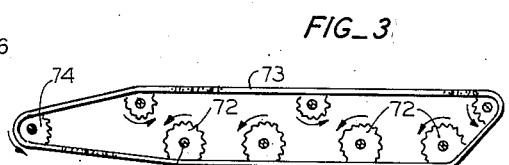
FIG_3
INVENTOR.
EARL R. ANDERSON
BY
ATTORNEYS

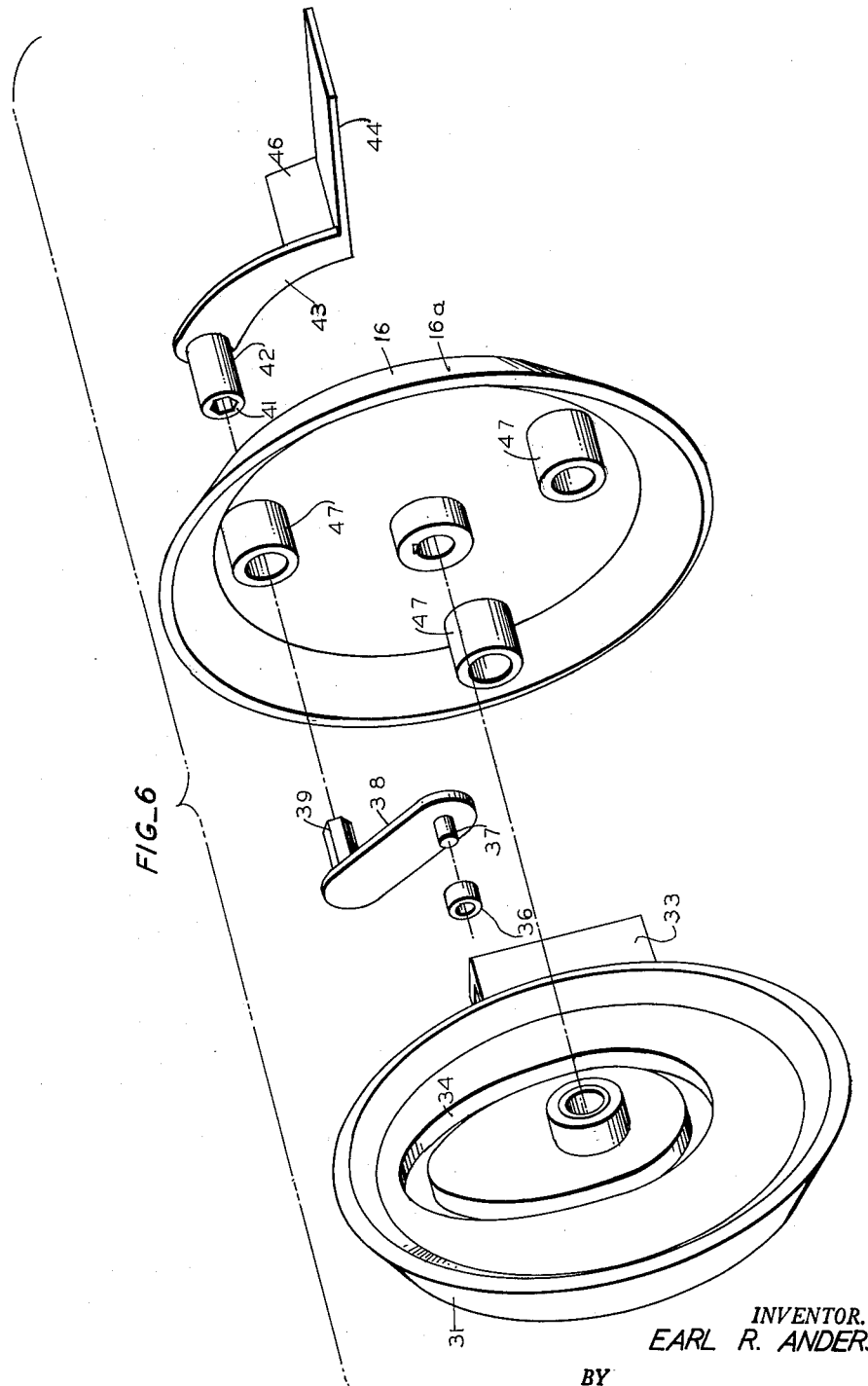

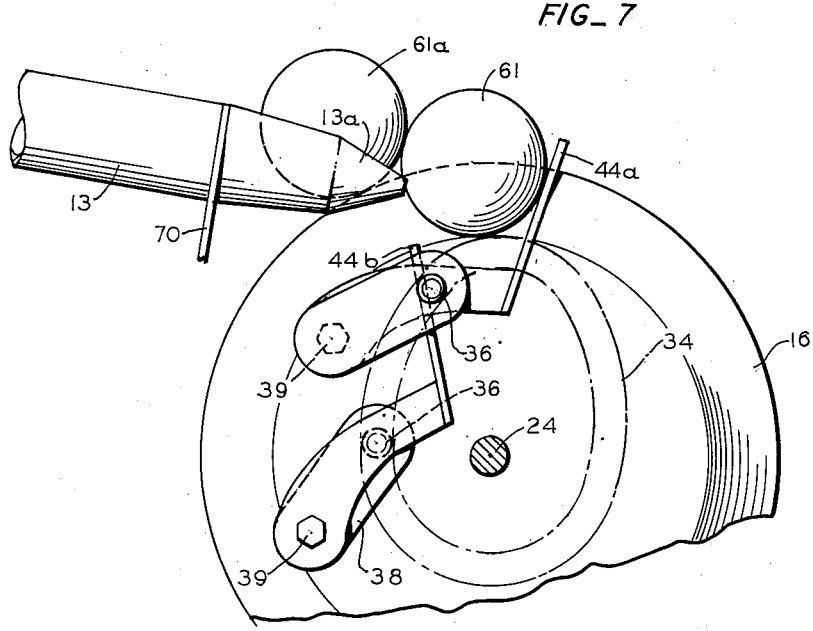
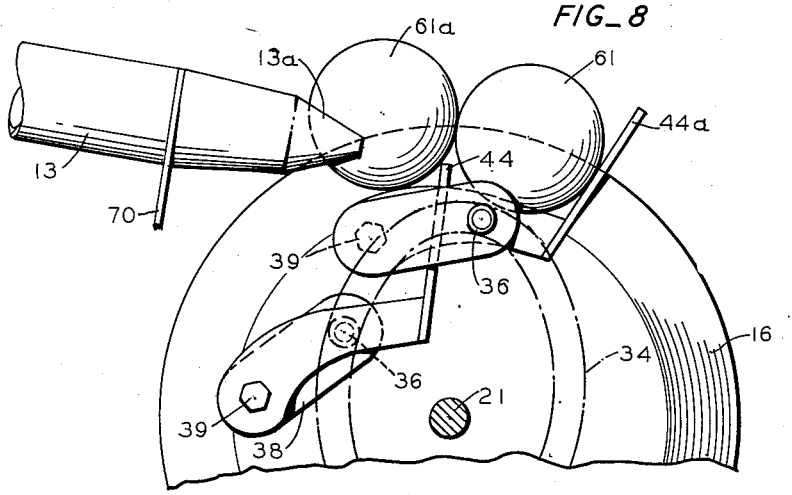
INVENTOR.
EARL R. ANDERSON
BY
*Allen and Chromy*
ATTORNEYS

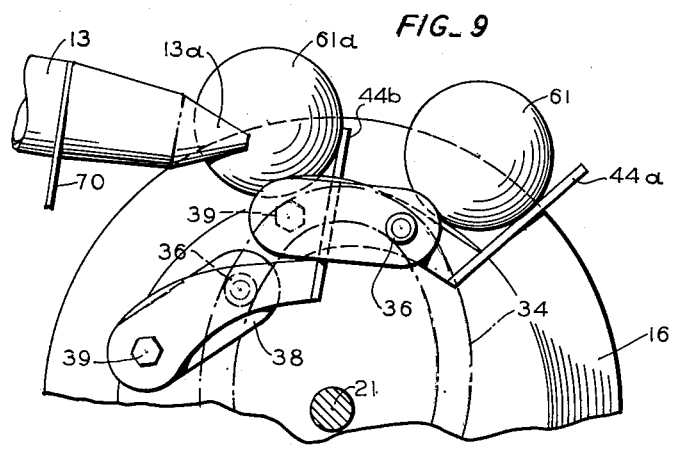
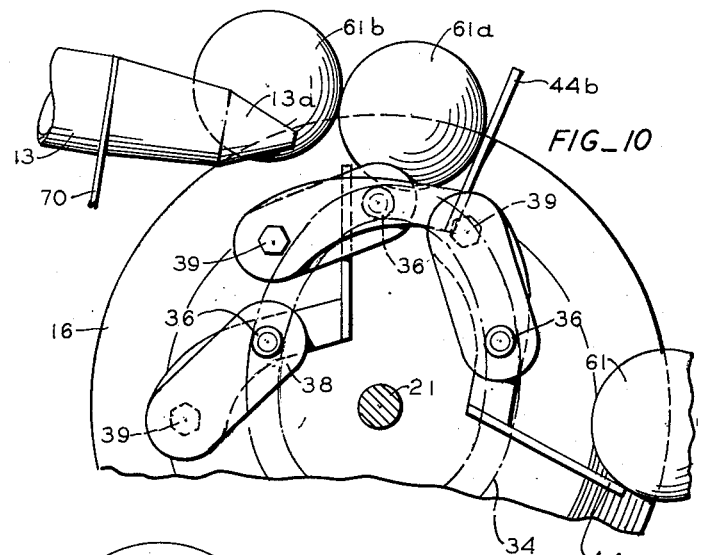
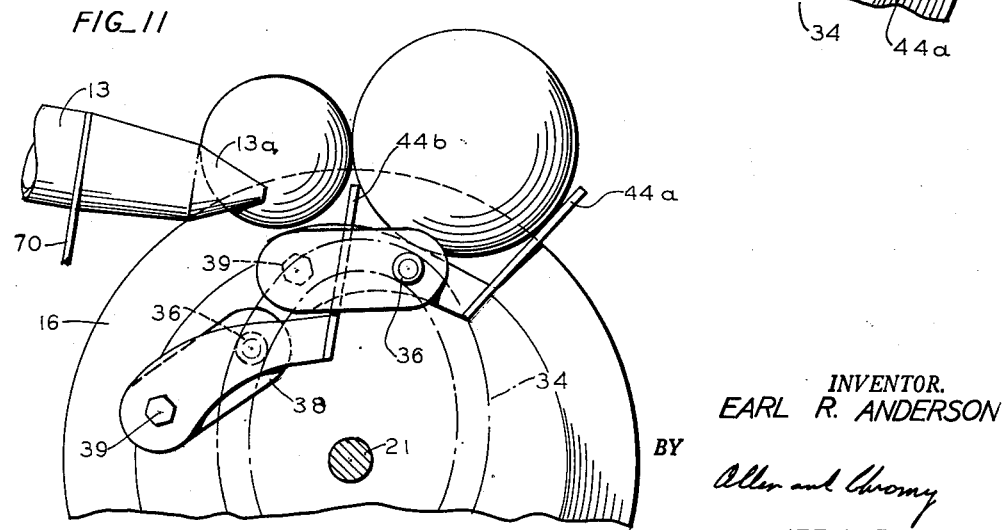
INVENTOR.
EARL R. ANDERSON

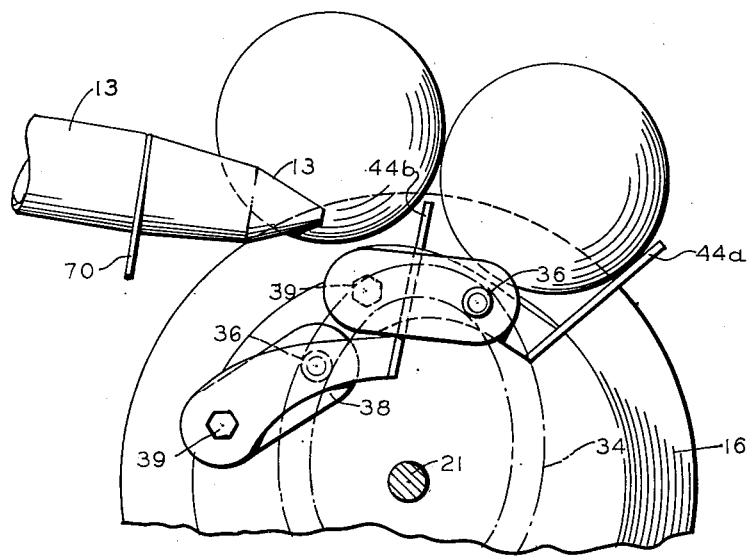
FIG_12
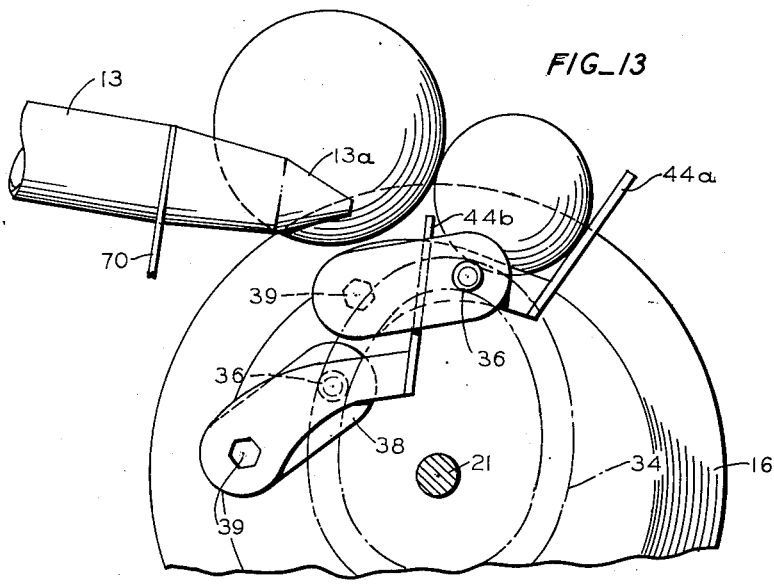
FIG_13

United States Patent Office 3,101,866
Patented Aug. 27, 1963

3,101,866
ENDLESS MECHANISM FOR ARTICLE-BY-ARTICLE DISCHARGE
Earl R. Anderson, 1900 Pollard Road, Campbell, Calif.
Filed Aug. 9, 1961, Ser. No. 130,421
14 Claims. (Cl. 221—93)

The present invention relates to an article-by-article discharge means for articles such as fruit, and is concerned more particularly with a continuously moving endless discharge mechanism whereby a single file of moving abutting articles can be separated into an article-by-article relation, particularly when the articles vary in diameter.

Another object of the invention is to provide a feed mechanism of the above character where the endless article-by-article discharge mechanism is made up of rotating parts so as to be continuous and automatic in its operation.

Another object of the invention is to provide a discharge or feed means for an article-by-article feed wherein the articles are handled in a single file flow which is continuously live in its movement, both as to being agitated by a supporting means or trough, and as to having a continuous forward or feeding movement.

Another object of the invention is to provide the discharge or feed means of above character in which the feeding, both in the single file abutting flow and in the article-by-article discharge, takes place in a single plane.

A further object of the invention is to provide a discharge means of the above character in which articles of different sizes within a given range can be handled in the same single file flow.

Still another object of the invention is to provide a discharge means for rollable articles such as fruits and vegetables wherein the structure is adaptable to a multiple parallel file operation. In other words, the units are adapted to be placed side-by-side so that a continuous feed of a plurality of rows can be effected in a timed relation.

Still another object of the invention is to provide multiple file feed troughs wherein the articles are fed by gravity, and the bottom and sides of the troughs are formed by rotating objects such as rollers, all rotating in the same direction so that any double layering is avoided by feeding the article off laterally of the single file conveying troughs.

The above and other objects of the invention are attained as described in connection with a preferred embodiment thereof, taken in connection with accompanying drawings, in which:

FIG. 1 is a fragmentary plan view of a multiple file endless discharge means incorporating the instant invention;

FIG. 2 is an enlarged sectional view, partially in elevation, illustrating the mounting and drive for certain rollers of the feed trough;

FIG. 3 is a schematic sectional view illustrating the chain drive for the rollers constituting the feed trough;

FIG. 4 is a sectional elevation taken generally in a plane indicated by the line 4—4 in FIG. 1;

FIG. 5 is a transverse vertical section taken generally in the planes indicated by the line 5—5 in FIG. 4;

FIG. 6 is an enlarged exploded perspective view illustrating component parts of one of the endless article-by-article discharge mechanisms;

FIGS. 7, 8, 9 and 10 are operational views of the mechanism illustrating the operation where the articles in the abutting file are of substantially the same size;

FIG. 11 is an operational view generally similar to FIG. 7 but illustrating the operation where a large article is followed by a small article;

FIG. 12 is an operational view similar to FIG. 7 illustrating the operation of the apparatus when two large articles are fed in succession;

FIG. 13 is another operational view similar to FIG. 7 in which a small article is followed by a large article.

Referring to FIGS. 1, 4 and 5, the endless article-by-article discharge mechanism includes a pair of opposite frame members 10 and 11 which are joined by a cross piece 12 adjacent their lower ends in FIG. 1, and are similarly connected at their upper ends at a suitable location (not shown). Suitably journaled for rotation on the frame members 10 and 11 are a series of rollers 13 and 14, the rollers 13 being arranged in pairs and being at one elevation and disposed in inclined relation, as seen in FIG. 4, and a roller 14 being at either side of a pair of rollers 13. Thus a pair of rollers 13 and a pair of rollers 14 provide an inclined generally V-shaped trough leading downwardly from their feed ends to the discharge ends. The rollers 13 are tapered at their discharge end 13a and the rollers 14 are similarly tapered at their discharge ends 14a to allow gentle dropping of articles therefrom.

As seen in FIG. 1, the respective rollers 13 and 14 are similar in construction, and the construction of one of the rollers 13 will be described. This roller 13 (FIG. 2) is made up of a main tubing part 13b which has end plates 13c by means of which it is secured to a support shaft 15. The tapered end 13a of the roller is suitably secured to the projecting end of the shaft 15, and this shaft 15 is journaled in a mounting ring or bracket 70 which extends to and is secured to the cross piece 12. At the feed end of the roller 13, there is provided a bearing support 71 for the shaft 15, and the shaft 15 carries a sprocket 72 which is engaged by a drive chain 73. As indicated in FIG. 3, the chain 73 connects all of the sprockets 72 for the rollers 13 and 14 and also engages the driving sprocket 74 which is connected to a suitable source of power so that all of the rollers rotate in the same direction, thereby providing a "live" supporting trough for each single file feed. Rollers 13 and 14 have their discharge ends unsupported and extending in a downwardly inclined relation of about 10° to the horizontal, and as they are all rotating in the same direction any second layer of article will be discharged to the left of FIG. 1 by virtue of the rotation of all the rollers in the same direction.

Each pair of rollers 13 form the bottom of a trough and discharge into a pair of rotating discharge disks 16 and 17 having opposed frusto-conical surfaces 16a and 17a at their periphery so as to also present a V-shaped rotating trough for the feed of articles. As seen in FIG. 5, each of the disks 16 and 17 is secured to a shaft 21 by a key 22 and a set screw 23 so that these two disks and the shaft rotate together. The shaft 21 is journaled in suitable bearings 24 on the frame members 10 and 11, and at one end the shaft 21 has a sheave 26 which is driven by a belt 27 from a suitable source of power.

Associated with the respective rotating disks 16 and 17 (FIGS. 4-6) are a pair of cam disks 31 and 32, and each of these disks 31 and 32 is secured by a bracket 33 to the cross member 12 of the frame. These stationary cam disks 31 and 32 have an internal generally egg-shaped cam groove 34 formed therein. Each cam groove 34 receives a plurality of rollers such as a roller 36 journaled on a pin 37 in a cam follower arm 38 having a hexagon shaft 39 at its opposite end. This hexagon shaft 39 is received in the internal hexagon bore 41 of a pivot hub 42 of an escapement lever 43, carrying a discharge control blade 44 at its end extending generally perpendicular to the lever 43. Each blade 44 has a ledge 46 formed at the base to provide additional article support and also provide strength in a junction between the discharge blade 44 and the arm 43. Each sleeve 42 is journaled in a bearing member 47 carried by one of the disks 16 or 17, and in FIG. 6 this is the disk 16, so that the discharge control blade can pivot about the axis of the bearing 47 as controlled by the cam slot 34. There are three of these discharge control blades 44 carried by the disk 16 and three carried by the opposed disk 17 so that the space between a pair of these disks 16 and 17 contains a total of six discharge control blades, as seen in FIG. 4 for example.

From the above description, it will be seen that, as the cam followers are following the lower half or substantially concentric portion of the cam track 34, the blades 44 will be moving at the same rotative speed as the disks 16 and 17. However, during travel along the cam rise, extending from the concentric portion to the high portion of the cam, the effect of the cam rise is to effect a rotation of the blades 44 in a counter-clockwise direction about their axis to project the blades radially of the disks and, in effect, to retard them so that their rotative movement is slower than the rotative movement of the disks 16 and 17.

Referring to FIG. 4 it will be seen that the blade 44x has its roller 36x just leading the concentric portion so that this blade 44x is starting to be projected radially of the disks 16 and 17 and is beginning to be retarded slightly in its movement in respect to these disks. This is at the point of entry of the blade into the feeding zone where an article drops from the rollers 13 and 14 into the trough formed by the frusto-conical surfaces 16a and 17a. The blade 44x at the top of FIG. 4 is still being projected, and is still being retarded with respect to the disks 16 and 17. The blade 44y is in a position to be engaged by an article 75, as shown for example in FIGS. 7, 9 and 11, while the blade 44x is starting to rise in back of this article and to enter the V between this article and the next adjacent one. After the blade has had its roller on the descending side of the cam slot, as seen for example with the blade 44y in FIG. 4, the blade is accelerated in rotative movement with respect to the disks 16 and 17 so as to tend to move away from the article controlled thereby, and it is beginning to be retracted gradually from its outermost position. The net result of the movement of the successive blades is to cause control of the articles leaving the trough shown in series in the FIGS. 7, 8, 9 and 10, FIG. 10 being close to the timing of FIG. 7 and showing how the blade clears the space between the articles and separates the articles so as to get an article-by-article discharge.

FIGS. 7, 8, 9 and 10 are a sequence of views of the mechanism showing two pieces of fruit of the same size, and in FIG. 7 the two articles 61 are in abutting relation and one blade 44a is holding the leading fruit article, and a second blade 44b is in position to begin entry into the separation between the two pieces of fruit. This action is continued in FIG. 8 when the second blade is actually entering the space between the two articles 61 and 61a.

In FIG. 9 the leading blade 44a has gone ahead and its fruit 61 is separated from the fruit 61a, which is being restrained by the blade 44b. In FIG. 10 the blade 44a has pulled away from the fruit 61 which is fed directly downward between the frusto-conical surfaces 16a and 17a of the disks 16 and 17, and the two succeeding articles 61a and 61b are in the same position as the two articles shown in FIG. 7. FIG. 11 shows the sequence of a large fruit followed by a small fruit in the feeding operation. FIG. 12 shows two large pieces of fruit of approximately the same size and with the blades 44a and 44b in the same approximate position as shown in FIG. 9. FIG. 13 shows a small fruit followed by a large fruit.

From the above description, it will be apparent that I have shown an article-by-article discharge mechanism for providing an article-by-article feed of rollable articles such as fruit of the character of apples, oranges, peaches, pears and the like, which provides a spaced relation for feeding to a series of pockets, or for feeding one-by-one to a processing machine. It will be noted that the character of the discharge mechanism is such that it can be contained laterally within the space of a feed row between the feed rollers 13 and 14, so that it provides an easy way for a compact parallel article-by-article feed in timed relation, because the various sets of disks 16 and 17 can be timed similarly on their shafts so that, in effect, a row-by-row feed of articles in spaced relation can be effected from a multiple file where the articles are abutting in each file.

While I have shown and described a preferred embodiment of the invention, it will be apparent that the invention is capable of variation and modification from the form shown, so that the scope thereof should be limited only by the scope of the claims appended hereto.

What I claim is:

1. An endless article-by-article discharge means for articles such as fruit, comprising a trough for feeding a single file of abutting fruit, a pair of adjacent endless elements having opposed surfaces providing a trough therebetween disposed to receive fruit from said first-named trough at a location adjacent their uppermost surfaces, means mounting said elements for movement along a vertically disposed endless path about a horizontal axis, a series of blades movably mounted on said elements for movement therewith and for movement with respect thereto, and means for controlling the movement of said blades to effect a vertically outward movement of each of the blades with respect to the elements to enter successively into controlling relation with successive articles being fed thereto.

2. An endless article-by-article discharge means for articles such as fruit, comprising a trough for feeding a single file of abutting fruit, article receiving means disposed to receive fruit from said trough at a location adjacent the uppermost surfaces of said article receiving means, means mounting said article receiving means along an endless path, a series of article separating blades movably mounted for movement with said article receiving means and for movement with respect thereto, and means for controlling the movement of each said blade to effect a vertically outward movement of each of the blades with respect to the elements to enter successively into separating relation with successive articles being fed to said receiving means.

3. An endless article-by-article discharge means for articles such as fruit, comprising a trough for feeding a single file of abutting fruit, a pair of adjacent endless elements providing article receiving means disposed to receive fruit from said trough at a location adjacent the uppermost surfaces of said receiving means, means mounting said elements for movement along an endless path, a series of discharge control means movably mounted for movement with said elements and for movement with respect thereto, and means for controlling each said discharge control means to effect upward movement thereof into discharge controlling relation with an article being fed thereto.

4. An endless article-by-article discharge means, comprising a frame, a pair of endless vertically disposed elements mounted in adjacent spaced relation on said frame and providing along their periphery an article trough, means for moving said elements through a vertically disposed endless path, means providing a feed of abutting single file articles for downward discharge onto said trough at a feed zone, and a plurality of discharge control blades carried by said elements in said trough and movable thereon, and means for controlling said blades during travel of said elements to cause said blades to project vertically upward into article-controlling position adjacent the point of discharge of articles at said feed zone.

5. An endless article-by-article discharge means, comprising a frame, a pair of endless vertically disposed elements mounted in adjacent spaced relation on said frame and providing along their periphery article receiving means, means for moving said elements through a vertically disposed endless path, means providing a feed of abutting single file articles for downward discharge onto said receiving means at a feed zone, and a plurality of discharge control means mounted for movement with elements and for movement with respect thereto, and means for controlling each discharge control means during travel of said elements to cause said discharge control means to move upwardly into article-controlling position adjacent the point of discharge of articles at said feed zone to control discharge of the endmost article only onto said endless elements.

6. An endless article-by-article discharge means, comprising a frame, vertically disposed article receiving means on said frame, means for moving said article receiving means through a vertically disposed endless path, means providing a feed of single file articles for discharge onto said article receiving means at a feed zone, and a plurality of article separating blades mounted for downward movement with said article receiving means and for movement with respect thereto, and means for controlling each blade during travel of said article receiving means to cause said blade to project upwardly into article-separating position between the endmost article of said file and the next article adjacent thereto to control discharge of articles at said feed zone from said file to said article receiving means.

7. An endless article-by-article discharge means as recited in claim 6, in which said article receiving means and said single file providing means extend in the same general longitudinal line.

8. An endless article-by-article discharge means as recited in claim 6, in which a plurality of parallel article receiving means are provided and a similar plurality of single file providing means are provided, said plurality of article receiving means being driven simultaneously and in timed relation to provide a row-by-row discharge of articles therefrom.

9. In an article feed mechanism, a first row of spaced-apart pairs of parallel rollers, there being at least two pair of said rollers, a second row of parallel rollers with a roller of said second row spaced above and between adjacent pairs of said first row and at one side of each end pair so as to form therewith respective parallel troughs defined by respective sets of said rollers, means for rotating said rollers, and an article-by-article discharge mechanism associated with the discharge end of each trough, each said discharge mechanism comprising a pair of opposed disks defining an article path therebetween, and a series of discharge control members movably mounted on said disks to engage successive articles from said troughs.

10. In an article feed mechanism, a first row of spaced-apart pairs of parallel rollers, a second row of parallel rollers with a roller of said second row spaced above and between adjacent pairs of said first row and at one side of each end pair so as to form therewith respective parallel troughs defined by respective sets of said rollers, said rollers being inclined to the horizontal, means for rotating said rollers in the same direction, and an article-by-article discharge mechanism associated with the lower discharge end of each trough, each said discharge mechanism comprising a pair of opposed disks defining an article path therebetween, and a series of discharge control members movably mounted on said disks to engage successive articles from said troughs.

11. In an article feed mechanism, a first row of spaced-apart pairs of parallel rollers, a second row of parallel rollers with a roller of said second row spaced above and between adjacent pairs of said first row and at one side of each end pair so as to form therewith respective parallel troughs defined by respective sets of said rollers, said rollers being inclined to the horizontal, means for rotating said rollers in the same direction, and an article-by-article discharge mechanism associated with the lower discharge end of each trough, each said discharge mechanism comprising a pair of opposed disks defining an article path therebetween, and a series of discharge control members movably mounted on said disks to engage successive articles from said troughs and the lower discharge ends of said roller being tapered and terminating adjacent said disks.

12. An endless article-by-article discharge means for articles such as fruit, comprising a first pair of adjacent disks mounted for simultaneous rotation and having opposed surfaces providing an article receiving means, a second pair of cam disks mounted outboard respectively of said first pair of disks and having similar cam tracks therein, a plurality of article separating and controlling blades mounted for pivotal movement on each of said first named disks respectively in alternating fashion and having means engaging the respective cam grooves in said cam disks, said cam grooves having a portion controlling rocking movement of said blades during their rotation with said first pair of disks to cause retrograde movement of said blades with respect to said disks and said cam grooves having another portion providing for accelerated movement of said blades with respect to said disks.

13. In an article feed mechanisms, a first group of rollers arranged in pairs, a second group of rollers with one roller disposed between and parallel to said pairs of rollers and at a higher elevation, all of said rollers having tapered ends at the discharge ends thereof and being inclined downwardly toward discharge ends, means mounting all of said rollers for rotation, and means for rotating said rollers in the same direction.

14. An endless article-by-article discharge means for articles such as fruit, comprising a pair of adjacent disks mounted for simultaneous rotation and having opposed surfaces providing an article receiving means therebetween, means for suppling a single file of abutting articles with the discharge end thereof adjacent said article receiving means at a feed zone, means for mounting a plurality of article separating blades between said disks for rotation therewith, said article separating blades being mounted for pivotal movement on each of said disks respectively in alternating fashion, and cam means for controlling movement of said blades including means for causing retrograde or retarded movement of said blades with respect to said disks at said feed zone and for simultaneously projecting the blade while it is being retarded to cause the blade to enter the V opening between the endmost article of said file and the next following article of said file and to retard said following article.

References Cited in the file of this patent
UNITED STATES PATENTS

| | | |
|---|---|---|
| 2,007,981 | Nordquist | July 16, 1935 |
| 2,069,872 | Burns | Feb. 9, 1937 |
| 2,193,942 | Shakelford | Mar. 19, 1940 |